H. E. BRYANT.
VESSEL CLOSURE.
APPLICATION FILED AUG. 25, 1911.

1,038,279.

Patented Sept. 10, 1912.

Witnesses
Alfred G. Sailer
Henry T. Bright

Inventor
Henry E. Bryant
By Chandler & Chandler
Attorney

UNITED STATES PATENT OFFICE.

HENRY E. BRYANT, OF JACKSONVILLE, FLORIDA, ASSIGNOR TO AMERICAN PATENT MANUFACTURING COMPANY, OF JACKSONVILLE, FLORIDA, A CORPORATION OF ARIZONA.

VESSEL-CLOSURE.

1,038,279.      Specification of Letters Patent.      Patented Sept. 10, 1912.

Application filed August 25, 1911. Serial No. 645,963.

*To all whom it may concern:*

Be it known that I, HENRY E. BRYANT, a citizen of the United States, residing at Jacksonville, in the county of Duval, State of Florida, have invented certain new and useful Improvements in Vessel-Closures; and I do hereby declare the following to be a full, clear, and exact description of the invention, such as will enable others skilled in the art to which it appertains to make and use the same.

This invention relates to vessel closures.

The object of the invention resides in the provision of a vessel closure which may be easily and quickly applied to a vessel to effect the closing thereof and when so applied may be readily locked against removal by rotation of said closure relatively to the vessel.

With the above and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1:
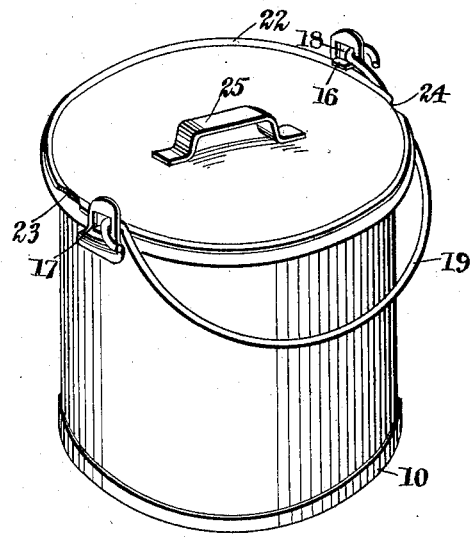
Figure 2:
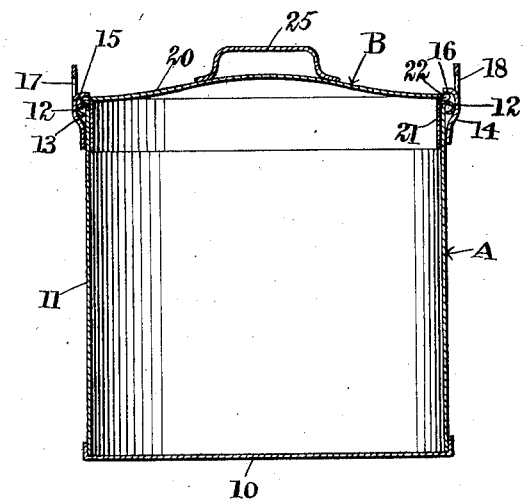

Figure 1 is a detail perspective view of a vessel having the improved closure associated therewith, the latter being shown in locked position, and Fig. 2, a vertical section of what is shown in Fig. 1.

Referring to the drawings, A indicates a vessel having the usual bottom 10 and cylindrical side wall 11 which latter is provided at its upper end with the usual strengthening bead 12. Secured to the upper end of the side wall 11 of the vessel A at diametrically opposite points are ears 13 and 14 which have struck therefrom inwardly directed tongues 15 and 16 respectively and producing in said ears resultant openings 17 and 18 for the attachment of respective ends of a handle or bail 19.

The closure of the vessel A is indicated generally at B and includes a crown or top portion 20 and a depending angular flange 21 which slides snugly within the cylindrical wall 11 of the vessel A. At the junction of the flange 21 and the crown 20 there is formed integral with the closure B an outwardly directed rib 22 provided at diametrically opposite points with recesses or notches 23 and 24 of sufficient size to allow respective tongues 15 and 16 to pass therethrough during the removal and application of the closure B.

In order to lock the closure B to the vessel A the former is applied to the vessel with the recesses 23 and 24 positioned to permit the passage of the tongues 15 and 16 therethrough respectively. When this is done the closure B is rotated relatively to the vessel A by means of a suitable handle 25 so that the rib 22 will pass beneath the tongues 15 and 16 and thus lock said closure against removal. By rotating the closure B relatively to the vessel A so as to bring the recesses 23 and 24 directly beneath the tongues 15 and 16 respectively the removal of the closure may be effected without hindrance.

What is claimed is:

In a vessel closure, the combination of a cylindrical vessel having an open upper end, a pair of ears secured to the upper end of the cylindrical wall of said vessel at diametrically opposite points, tongues struck centrally from said ears respectively inwardly and downwardly above the margin of the vessel and forming resultant perforations above the tongues in said ears, a bail having its ends engaged in said perforations respectively, a closure for the open end of said vessel comprising a crown and a depending annular flange carried by the latter and slidable in the vessel, and a laterally directed rib carried by said closure having recesses therein at diametrically opposite points through which said tongues respectively pass in the application and removal of the closure, said rib being adapted to pass beneath said tongues upon rotation of the closure relatively to the vessel when the former is applied to the latter whereby the closure and vessel are locked against disengagement from each other.

In testimony whereof, I affix my signature, in presence of two witnesses.

HENRY E. BRYANT.

Witnesses:
    E. IRVIN BURNS,
    GEO. E. CHANDLEE.

---

Copies of this patent may be obtained for five cents each, by addressing the "Commissioner of Patents, Washington, D. C."